(12) United States Patent
Iida et al.

(10) Patent No.: US 8,536,260 B2
(45) Date of Patent: Sep. 17, 2013

(54) RESIN COMPOSITION FOR SEAMLESS AIR BAG COVERS, AND SEAMLESS AIR BAG COVERS OR SEAMLESS INSTRUMENT PANELS WITH AIR BAG COVERS, MADE BY USING THE COMPOSITION

(75) Inventors: Kazuyuki Iida, Ichihara (JP); Kazuaki Kihara, Ichihara (JP); Mutsuo Fujii, Hiroshima (JP); Mamoru Maruyama, Hiroshima (JP)

(73) Assignees: Prime Polymer Co., Ltd., Tokyo (JP); Daikyonishikawa Corporation, Aki-gun (JP)

( * ) Notice: Subject to any disclaimer, the term of this patent is extended or adjusted under 35 U.S.C. 154(b) by 0 days.

(21) Appl. No.: 13/027,452

(22) Filed: Feb. 15, 2011

(65) Prior Publication Data

US 2011/0133509 A1    Jun. 9, 2011

Related U.S. Application Data

(63) Continuation of application No. 10/577,152, filed as application No. PCT/JP2004/015226 on Oct. 15, 2004, now abandoned.

(51) Int. Cl.
*C08J 3/22* (2006.01)

(52) U.S. Cl.
USPC ........ 524/451; 524/528; 280/728.1; 280/731; 280/732

(58) Field of Classification Search
USPC ...... 280/728.1, 731, 732; 425/542; 524/451, 524/528
See application file for complete search history.

(56) References Cited

U.S. PATENT DOCUMENTS

| | | | |
|---|---|---|---|
| 5,082,089 A | | 1/1992 | Renk et al. |
| 5,082,888 A | | 1/1992 | Abe et al. |
| 5,747,576 A | | 5/1998 | Sobajima et al. |
| 6,316,068 B1 | * | 11/2001 | Masubuchi et al. .......... 428/35.7 |
| 6,716,519 B2 | * | 4/2004 | Ueno et al. ................. 428/308.4 |
| 2002/0147281 A1 | * | 10/2002 | Tsuji et al. .................... 525/240 |
| 2004/0044111 A1 | * | 3/2004 | Kakarala et al. .............. 524/442 |
| 2006/0199891 A1 | | 9/2006 | Sugita et al. |

FOREIGN PATENT DOCUMENTS

| | | |
|---|---|---|
| EP | 1 038 918 | 9/2000 |
| JP | 08-208896 | 8/1996 |
| JP | 10-158442 | 6/1998 |
| JP | 2001-191885 | 7/2001 |
| JP | 2003-183459 | 7/2003 |
| JP | 2003-522068 | 7/2003 |
| JP | 2004-175121 | 6/2004 |

* cited by examiner

*Primary Examiner* — Peter D Mulcahy
(74) *Attorney, Agent, or Firm* — Oblon, Spivak, McClelland, Maier & Neustadt, L.L.P.

(57) ABSTRACT

A resin composition for a seamless air bag cover or a resin composition for a seamless instrument panel having an air bag cover which comprises (A) 50 to 90% by mass of polypropylene, (B) 0 to 20% by mass of a thermoplastic elastomer and (C) 10 to 30% by mass of talc having an average particle diameter of 15 to 25 μm and a distribution of a particle diameter such that the content of particles having a diameter of 5 μm or smaller is 10% by mass or smaller and the content of particles having a diameter exceeding 40 μm is 10% by mass or smaller. The resin composition exhibits sufficient properties when an instrument panel is molded. A seamless instrument panel having an air bag cover can be obtained as an integrally molded product, which can be treated as a single article in recycling.

35 Claims, 1 Drawing Sheet

RESIN COMPOSITION FOR SEAMLESS AIR BAG COVERS, AND SEAMLESS AIR BAG COVERS OR SEAMLESS INSTRUMENT PANELS WITH AIR BAG COVERS, MADE BY USING THE COMPOSITION

The present application is a Continuation application of Ser. No. 10/577,152 filed Apr. 26, 2006, now abandoned, which is a national stage application of PCT/JP04/15226 filed Oct. 15, 2004.

TECHNICAL FIELD

The present invention relates to a resin composition for forming a cover of a container portion of an air bag apparatus which is activated and expanded on collision of an automobile (an air bag cover). More particularly, the present invention relates to a resin composition for a seamless air bag cover or a resin composition for a seamless instrument panel having an air bag cover which exhibits sufficient properties when an instrument panel is injection molded and provides a seamless instrument panel having an air bag cover as an integrally molded product, which can be treated as a single article in recycling.

BACKGROUND ART

In a seamless instrument panel having an air bag cover, a predesignated splitting line is formed so that the air bag cover is easily split when an air bag apparatus is activated and expanded on collision of an automobile.

Heretofore, an air bag cover has been formed with a soft highly impact resistant material even when it is accompanied with decrease in rigidity or heat resistance so that formation of pieces having sharp shapes can be prevented even when the air bag cover is broken at the time of the splitting.

It is also conducted that talc is added to a resin composition for an air bag cover so that some degree of rigidity is provided to the air bag cover. In general, fine talc (having an average particle diameter of 10 μm or smaller, in particular, 6 μm or smaller) exhibiting an effect of greatly improving heat resistance and rigidity is used.

As the air bag cover, an air bag cover molded from a composition containing polypropylene, an ethylene-α-olefin copolymer rubber and talc having an average particle diameter of 15 μm or smaller is disclosed. This air bag cover is used in combination with an instrument panel molded separately to form a single article (for example, Patent Reference 1).

Since the above resin composition for an air bag cover cannot have a great rigidity due to a great content of the rubber component, integral molding of an instrument panel and an air bag cover using this resin composition as the single material is not possible.

An air bag molded from a composition containing polypropylene, two types of ethylene-α-olefin-based amorphous copolymer, a propylene-1-butene copolymer exhibiting low crystallinity and a mineral oil-based softening agent is disclosed (for example, Patent Reference 2). The use of talc is described in the reference, but no descriptions can be found on the diameter of particles of the talc.

In Patent Reference 1, different materials are used for the composition for the air bag and the composition for the instrument panel.

Therefore, it is necessary for achieving the "seamless" condition of an air bag cover and an instrument panel that the air bag cover and the instrument panel be melt adhered for integration.

The above process for integration has a drawback in that the portion of melting tends to protrude from the surface.

When a material for a face film is inserted into a mold to attach the face film to the outer faces of an air bag and an instrument panel, problems arise in that the face material moves in the mold and wrinkles are formed on the face film. It is the real situation at present that this process cannot fully satisfy the requirements in the market.

Since the composition for an air bag and the composition for an instrument panel are different materials, the composite product cannot be treated as a single article in recycling.

Patent Reference 1: Japanese Patent Application Laid-Open No. Heisei 10 (1998)-273001

Patent Reference 2: Japanese Patent Application Laid-Open No. Heisei 10 (1998)-279745

DISCLOSURE OF THE INVENTION

The present invention has been made under the above circumstances and has an object of providing a resin composition which is advantageously used as a resin composition for a seamless air bag cover, can be used as a resin composition for a seamless instrument panel having an air bag cover which is formed with a single material, exhibits excellent balance between impact resistance and rigidity and can be used for integral molding of a seamless air bag cover and an instrument panel, and a seamless air bag cover and a seamless instrument panel having an air bag cover comprising the composition.

As the result on intensive studies by the present inventors to overcome the above problems, it was found that the above object could be achieved with a resin composition comprising polypropylene, a thermoplastic elastomer and a specific amount of talc having a specific average particle diameter and a specific distribution of the particle diameter.

The present invention has been completed based on the knowledge.

The present invention provides:

(1) A resin composition for a seamless air bag cover or a resin composition for a seamless instrument panel having an air bag cover which comprises (A) 50 to 90% by mass of polypropylene, (B) 0 to 20% by mass of a thermoplastic elastomer and (C) 10 to 30% by mass of talc, wherein the talc has an average particle diameter of 15 to 25 μm and a distribution of a particle diameter such that a content of particles having a diameter of 5 μM or smaller is 10% by mass of smaller and a content of particles having a diameter exceeding 40 μm is 10% by mass or smaller;

(2) A resin composition for a seamless air bag cover or a resin composition for a seamless instrument panel having an air bag cover described in (1), wherein the thermoplastic elastomer of component (B) is an ethylene-α-olefin copolymer elastomer;

(3) A resin composition for a seamless air bag cover or a resin composition for a seamless instrument panel having an air bag cover described in any one of (1) and (2), wherein the resin composition has (1) an Izod impact strength of 15 to 40 kJ/m$^2$ as measured in accordance with a method of ASTM D256 at 23° C. with a notch, (2) a flexural modulus of 1,600 to 3,000 MPa as measured in accordance with a method of ASTM D790 at 23° C. and (3) a melt flow rate (MFR) of 5 to 40 g/10 minutes as measured in accordance with a method of JIS K7210 at 230° C. under a load of 21.2 N (2.16 kgf);

(4) A seamless air bag cover comprising a resin composition described in (1); and (5) A seamless instrument panel having an air bag cover which is obtained by integrally molding a seamless air bag cover comprising a resin composition described in (1) and an instrument panel comprising the resin composition.

Figure 1:
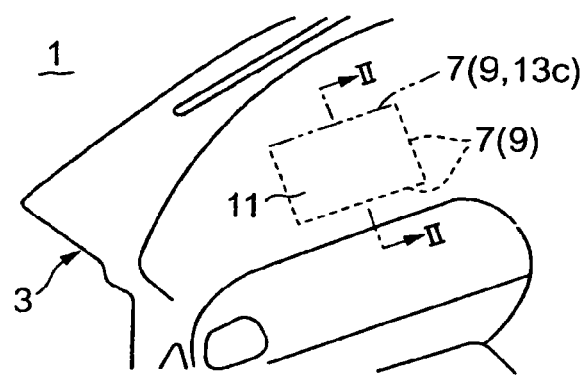
FIG. 1 shows a perspective view of a seamless instrument panel having an air bag cover which is formed by integrally molding a seamless air bag cover and an instrument panel and used in the expansion test in Examples.

The numbers in Figures have the following meanings:
1: An instrument panel
3: A main portion of an instrument panel
5: An air bag cover
7: A predesignated portion of splitting
11: A cover portion

THE MOST PREFERRED EMBODIMENT TO CARRY OUT THE INVENTION

In the present invention, examples of polypropylene used as component (A) include homopolypropylene, block polypropylene and random polypropylene. Block polypropylene is preferable from the standpoint of the balance between impact resistance and rigidity.

It is necessary that the content of polypropylene be 50 to 90% by mass based on the total of the amounts of components (A), (B) and (C).

When the content of polypropylene is 50% by mass or greater and the content of the thermoplastic elastomer is 20% by mass or smaller, the balance between impact resistance and rigidity of the air bag cover is satisfactory. When the content of talc is 10 to 30% by mass, rigidity and the property for expansion of the air bag are excellent.

When the content of polypropylene is 90% by mass or smaller, fracture of the air bag cover portion itself is suppressed and scattering of pieces having sharp shapes is suppressed when the air bag apparatus is enlarged and expanded since impact resistance of the air bag cover increases.

The polypropylene preferably has a melt flow rate (MFR) of 8 g/10 minutes or greater and more preferably 10 to 70 g/10 minutes as measured in accordance with the method of JIS K7210 at 230° C. under a load of 21.2 N (2.16 kgf).

When the melt flow rate of the polypropylene is 5 g/10 minutes or greater, polypropylene can be injection molded, following complicated shapes formed at the inside of the air bag cover such as reinforcing ribs.

Examples of the thermoplastic elastomer of component (B) include ethylene-α-olefin copolymer elastomers such as binary or higher multi-component copolymer elastomers of ethylene and α-olefins which are preferably α-olefins having 3 to 8 carbon atoms such as propylene, butene-1, hexene-1 and octene-1.

Examples of the thermoplastic elastomer also include ternary or higher multi-component copolymer elastomers prepared by copolymerization of the above copolymer elastomers with a non-conjugated diene and mixtures of propylene-based resins and the copolymer elastomers, Examples of the thermoplastic elastomer also include olefin-based thermoplastic elastomers such as polypropylene containing a great amount of copolymerized rubber having a content of rubber of 25% by mass or greater which is measured as the amount of an extract with boiling xylene.

Examples of the thermoplastic elastomer also include styrene-based thermoplastic elastomers, examples of which include block copolymers of styrene and conjugated dienes such as butadiene and isoprene and hydrogenation products of the block copolymers such as SEBS.

The above thermoplastic elastomer may be used as a mixture of two or more.

From the standpoint of the property for recycling, it is preferable that an ethylene-α-olefin copolymer elastomer is used as component (B).

It is necessary that the content of the thermoplastic elastomer of component (B) be 0 to 20% by mass based on the total of the amounts of components (A), (B) and (C).

From the standpoint of the balance between impact resistance and rigidity, it is preferable that the content is in the range of 3 to 15% by mass.

When the content of the thermoplastic elastomer is 20% by mass or smaller, rigidity is excellent, and the functions as the instrument panel can be sufficiently exhibited.

It is necessary that the content of talc of component (C) be 10 to 30% by mass based on the total of the amounts of components (A), (B) and (C). It is necessary that talc have an average particle diameter of 15 to 25 μm and a distribution of the particle diameter such that the content of particles having a diameter of 5 μm or smaller is 10% by mass or smaller and the content of particles having a diameter exceeding 40 μm is 10% by mass or smaller.

The average particle diameter is measured in accordance with the laser diffraction method (for example, using SALD-2000 manufactured by SHIMADZU Corp.).

The content of talc is preferably 15 to 30% by mass and more preferably 20 to 30% by mass from the standpoint of the balance between impact resistance and rigidity.

When the content of talc is 10% by mass or greater, the balance between rigidity and impact strength is excellent, and the functions as the instrument panel can be exhibited.

When the content of talc is 30% by mass or smaller, the splitting at the predesignated line of splitting on the seamless air bag cover takes places clearly, and no pieces are scattered.

It is necessary that the average particle diameter of talc be in the range of 15 to 25 μm.

When the average particle diameter of talc exceeds 25 μm, it is difficult that rigidity and impact resistance required for the instrument panel are maintained.

When the average particle diameter is 15 μm or greater, the splitting at the predesignated line of splitting on the seamless air bag cover takes places clearly, and no pieces are scattered.

It is necessary that talc have a distribution of the particle diameter such that the content of particles having a diameter of 5 μm or smaller is 10% by mass or smaller and the content of particles having a diameter exceeding 40 μm is 10% by mass or smaller.

It is preferable that the content of particles having a diameter of 5 μm or smaller is 8% by mass or smaller and the content of particles having a diameter exceeding 40 μm is 8% by mass or smaller.

When the content of particles having a diameter of 5 μm exceeds 10% by mass in the distribution of the particle diameter of talc, the impact strength is exceedingly great, and the air bag is not split clearly at the predesignated line of splitting at the time of expansion of the air bag.

When the content of particles having a diameter exceeding 40 μm exceeds 10% by mass, the impact strength is exceedingly small, and there is the possibility that the cover portion itself is broken to form scattered pieces with sharp shapes.

As described above, when talc having the distribution of the particle diameter such that the content of particles having a diameter of 5 μm or smaller is 10% by mass or smaller and the content of particles having a diameter exceeding 40 μm is 10% by mass or smaller is used, in particular, fracture of the air bag takes place excellently at the predesignated groove for expansion of the air bag when the air bag is enlarged and expanded, and fracture and scattering of the air bag cover portion itself do not take place.

The resin composition for a seamless air bag cover of the present invention can be produced by melt mixing components (A) to (C) in accordance with a conventional process using a single screw extruder or a twin screw extruder.

It is preferable that the resin composition has an Izod impact strength of 15 to 40 kJ/m$^2$ as measured in accordance with the method of ASTM D256 at 23° C. with a notch, a flexural modulus of 1,600 to 3,000 MPa as measured in accordance with the method of ASTM D790 at 23° C., and a melt flow rate (MFR) of 5 to 40 g/10 minutes as measured in accordance with the method of JIS K7210 at 230° C. under a load of 21.2 N (2.16 kgf).

When the Izod impact strength (23° C., with a notch) is 15 kJ/m$^2$ or greater, impact resistance is excellent, and the use of the same material as the material of the instrument panel can be facilitated.

When the Izod impact strength exceeds 40 kJ/m$^2$, the air bag is not clearly split at the predesignated line of splitting due to an exceedingly great impact resistance.

When the flexural modulus is 1,600 MPa or greater, rigidity increases, and the use of the same material as that used for the instrument panel is facilitated.

When the bending modulus exceeds 3,000 MPa, rigidity increases exceedingly, and there is the possibility that the air bag cover itself is broken when the air bag is enlarged and expanded, and pieces having sharp shapes are scattered.

The flexural modulus is preferably 1,800 to 2,300 MPa.

When the melt flow rate is 5 g/10 minutes or greater, the property for injection molding of the composition is improved. When the melt flow rate is 40 g/10 minutes or smaller, the molecular weight of polypropylene of component (A) is not decreased, and the mechanical properties of the air bag cover are improved.

The seamless air bag cover and the seamless instrument panel having an air bag cover produced by using the resin composition of the present invention show brittle fracture in the case of fracture by planar impact and are clearly broken at the predesignated line of splitting without scattering of pieces.

For the seamless air bag cover of the present invention, other conditions (such as the shape of the cover, the method of attachment to a body or an interior of an automobile and sawing lines and hinge structures of the portion of attachment) are the same as those for conventional seamless air bag covers as long as the above resin composition is used.

Since the seamless air bag cover of the present invention exhibits excellent balance between impact resistance and rigidity, the resin composition used therefor can be used also for other interior members such as an instrument panel.

Therefore, the article having an air bag cover and an instrument panel which are integrally molded can be produced in accordance with the dichromatic molding process or the conventional injection molding process. Since the production can be conducted using a single material, the seamless structure can be easily obtained without lamination of a face film.

Figure 2:
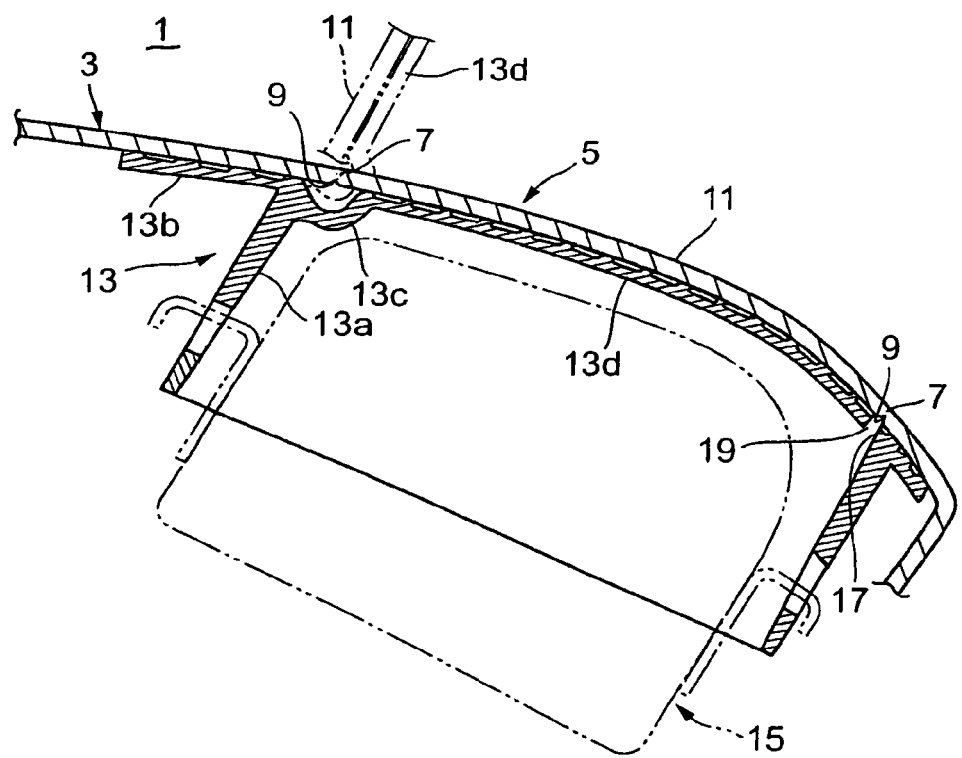
FIG. 2 shows a section of the seamless instrument panel having an air bag cut along the line II-II in FIG. 1.

An example of the seamless instrument panel having an air bag cover using the resin composition of the present invention is shown in FIG. 1 and FIG. 2.

FIG. 1 shows a perspective view of a seamless instrument panel having an air bag cover which is formed by integrally molding a seamless air bag cover and an instrument panel and used in the expansion test in Examples. FIG. 2 shows a section of the seamless instrument panel having an air bag cut along the line II-II in FIG. 1.

In FIGS. 1 and 2, 1 shows an instrument panel formed by integrally molding the main portion 3 of the instrument panel and an air bag cover 5 using the resin composition of the present invention.

In the air bag cover 5, a thin predesignated portion of splitting (a weak portion) [corresponding to the predesignated groove for fracture on expansion of the air bag] 7 is formed as a notch 9 formed at the back face thereof, and an air bag cover portion (simply referred to as a "cover portion", hereinafter) 11 is formed at the portion surrounded by the notch 9.

Therefore, the air bag cover 5 is an air bag cover of the seamless type which is constituted with the cover portion 11 and the main portion of the instrument panel 3 in the vicinity of the cover portion 11 and does not show the predesignated portion of splitting in the view at the outside of the air bag cover 5.

At the back face of the air bag cover 5, a frame 13 having a rectangular shape in the planar view is disposed.

The frame 13 is constituted with a container portion 13a for containing an air bag module 15, a flange portion 13b integrally formed with the container portion 13a and a backup portion 13d integrally formed with the container portion 13a via a hinge portion 13c.

A gap 19 is formed between three edges of the backup portion 13d except the hinge portion 13c and a shooting portion 17 of the container portion 13a.

The backup portion 13d is melt adhered by vibration at the back face of the cover portion 11 in a manner such that the hinge portion 13c is placed at a position corresponding to the predesignated portion of splitting 7 at the front side of the vehicle extending in the transverse direction of the vehicle.

The flange portion 13b is melt adhered by vibration to the back face of the air bag cover 5 (the main portion 3 of the instrument panel) in the vicinity of the cover portion 11.

The air bag cover 5 and the frame 13 constructed as described above are broken at the predesignated portion of splitting 7 by the pressure of the air bag when the air bag module 15 is activated, and the backup portion 13d and the cover portion 11 are expanded together as shown by the virtual line. The air bag is expanded to the outside from an opening formed by fracture of the predesignated portion of splitting 7 through an opening for shooting 17.

EXAMPLES

The present invention will be described more specifically with reference to examples in the following. However, the present invention is not limited to the examples.

Examples 1 and 2 and Comparative Examples 1 to 3

Resin compositions were obtained by mixing the components of formulations shown in Table 1 using a twin screw extruder having a diameter of 50 mm at a temperature of 200° C.

The obtained resin compositions were evaluated in accordance with the following methods. The results are shown in Table 1.

(1) Property for Expansion of an Air Bag

Seamless instrument panels having an air bag cover having a shape shown in FIGS. 1 and 2 were prepared in accordance with the injection molding using the above resin compositions. At the back face thereof, a predesignated line of splitting was formed, and an air bag module was melt adhered by vibration.

The expansion test was conducted using the above seamless instrument panel having an air bag cover. The evaluation by visual observation was made on: whether the fracture took place at the predesignated portion of splitting or not; whether cracks were formed in the vicinity of the portion of splitting or not; and whether pieces formed by the fracture are scattered or not. The result of the evaluation was decided based on the findings.

The criterion for the decision was as follows: the product was decided to have passed the test when the fracture took place at the predesignated portion of splitting, no cracks were found in the vicinity of the portion of splitting, and no pieces formed by the fracture were scattered; and the product was decided to have failed in the test when the fracture took place at a portion other than the predesignated portion of splitting, cracks were found in the vicinity of the portion of splitting, or pieces formed by the fracture were scattered.

(2) Melt Flow Rate (MFR)

The melt flow rate of a resin composition and polypropylene was measured in accordance with the method of JIS K 7210 at 230° C. under a load of 21.2 N (2.16 kgf).

(3) Flexural Modulus

The flexural modulus was measured in accordance with the method of ASTM D790 at 23° C.

(4) Izod Impact Strength

The Izod impact strength was measured in accordance with the method of ASTM D256 at 23° C. with a notch.

(5) Condition of Fracture by Planar Impact

A high rate impact test was conducted in accordance with the method of ISO 6603-2 (brittle fracture) at −30° C.

TABLE 1

|  | Example | | Comparative Example | | |
| --- | --- | --- | --- | --- | --- |
|  | 1 | 2 | 1 | 2 | 3 |
| Components of formulation (% by mass) | | | | | |
| PP-A | 65 | 65 | 65 | 65 | 65 |
| Elastomer A | 10 | | | | |
| Elastomer B | | 10 | 10 | 10 | 10 |
| Talc A | | | 25 | | |
| Talc B | 25 | 25 | | | |
| Talc C | | | | 25 | |
| Talc D | | | | | 25 |
| Property for expansion of air bag | passed | passed | failed | failed | failed |
| MFR (g/10 min) | 25 | 25 | 25 | 23 | 25 |
| Flexural modulus (MPa) | 2200 | 2200 | 2200 | 2450 | 2100 |
| Izod (kJ/m$^2$) | 25 | 28 | 25 | 30 | 14 |
| Condition of fracture by high rate impact test | brittle | brittle | brittle | ductile | brittle |

(Notes)
PP-A: A block polypropylene [manufactured by IDEMITSU SEKIYU KAGAKU Co., Ltd.; J3054HP]; MFR: 40 g/10 minutes.
Elastomer A: An ethylene-butene-1 copolymer elastomer [manufactured by MITSUI KAGAKU Co., Ltd.; TUFMER A1050S]; MFR: 1.0 g/10 minutes; the density: 861 kg/m$^3$.
Elastomer B: An ethylene-octene-1 copolymer elastomer [manufactured by DU PONT DOW Company; EG8842]; MFR: 1.0 g/10 minutes; the density: 857 kg/m$^3$.
Talc A: The average particle diameter: 20 μm; the distribution of particle diameter; 2% by mass of particles having a diameter of 5 μm or smaller and 12% by mass of particles having a.diameter exceeding 40 μm.
Talc B: The average particle diameter; 17 μm; the distribution of particle diameter: 8% by mass of particles having a diameter of 5 μm or smaller and 8% by mass of particles having a diameter exceeding 40 μm.
Talc C: The average particle diameter: 8 μm; the distribution of particle diameter: 2% by mass of particles having a diameter of 5 μm or smaller and 0% by mass of particles having a diameter exceeding 40 μm.
Talc D: The average particle diameter: 30 μm; the distribution of particle diameter: 1% by mass of particles having a diameter of 5 μm or smaller and 8% by mass of particles having a diameter exceeding 40 μm.

INDUSTRIAL APPLICABILITY

In accordance with the present invention, the resin composition for a seamless air bag cover and the resin composition for a seamless instrument panel having a air bag cover which exhibit sufficient properties in the injection molding of an instrument panel and can provide by integral molding an instrument panel having a seamless air bag cover, which can be treated as a single member in recycling, can be obtained.

The seamless air bag cover formed by using the above resin composition exhibits the advantageous effects in that, when the air bag cover is expanded with splitting of the air bag cover by activation of the air bag apparatus, the air bag cover itself is not broken and no pieces having sharp shapes are formed, and formation of rugged forms which tend to cause injury is suppressed at the section of the instrument panel after the air bag cover has been removed.

The invention claimed is:

1. A seamless air bag cover obtained by injection molding comprising a resin composition which comprises
    (A) 50 to 87% by mass of polypropylene, (B) 3 to 20% by mass of a thermoplastic elastomer and (C) 10 to 30% by mass of talc, wherein the talc has an average particle diameter of 15 to 25 μm and a distribution of a particle diameter such that a content of particles having a diameter of 5 μm or smaller is 10% by mass or smaller and a content of particles having a diameter exceeding 40 μm is 10% by mass or smaller,
    wherein the thermoplastic elastomer is at least one selected from the group consisting of an ethylene-octene-1 copolymer and an ethylene-butene-1 copolymer.

2. A seamless instrument panel having an air bag cover which is obtained by integrally injection molding a seamless air bag cover comprising a resin composition which comprises
    (A) 50 to 87% by mass of polypropylene, (B) 3 to 20% by mass of a thermoplastic elastomer and (C) 10 to 30% by mass of talc, wherein the talc has an average particle diameter of 15 to 25 μm and a distribution of a particle diameter such that a content of particles having a diameter of 5 μm or smaller is 10% by mass or smaller and a content of particles having a diameter exceeding 40 μm is 10% by mass or smaller and an instrument panel comprising the resin composition and an instrument panel comprising the resin composition,
    wherein the thermoplastic elastomer is at least one selected from the group consisting of an ethylene-octene-1 copolymer and an ethylene-butene-1 copolymer.

3. The seamless air bag cover according to claim 1, having a predesignated splitting portion.

4. The seamless instrument panel according to claim 2, having a predesignated splitting portion.

5. The seamless air bag cover according to claim 1, which is in an activated and expanded condition.

6. The seamless air bag cover according to claim 1, wherein the resin composition comprises (C) 25 to 30% by mass of talc.

7. A seamless instrument panel having an air bag cover which is obtained by integrally injection molding the seamless air bag cover according to claim 2, wherein the resin composition comprises (C) 25 to 30% by mass of talc.

8. The seamless air bag cover according to claim 1, wherein the resin composition has (1) an Izod impact strength of 15 to 40 kJ/m$^2$ as measured in accordance with a method of ASTM D256 at 23° C. with a notch, (2) a flexural modulus of 1,600 to 3,000 MPa as measured in accordance with a method of ASTM D790 at 23° C. and (3) a melt flow rate (MFR) of 5 to 40 g/10 minutes as measured in accordance with a method of JIS K7210 at 230° C. under a load of 21.2 N (2.16 kgf).

9. The seamless instrument panel according to claim 2, wherein the resin composition has (1) an Izod impact strength of 15 to 40 kJ/m$^2$ as measured in accordance with a method of ASTM D256 at 23° C. with a notch, (2) a flexural modulus of 1,600 to 3,000 MPa as measured in accordance with a method of ASTM D790 at 23° C. and (3) a melt flow rate (MFR) of 5 to 40 g/10 minutes as measured in accordance with a method of JIS K7210 at 230° C. under a load of 21.2 N (2.16 kgf).

10. The seamless air bag cover according to claim 1, wherein the talc is present in an amount of 20 to 30% by mass and a distribution of a particle diameter is such that a content of particles having a diameter of 5 μm or smaller is 8% by mass or smaller and a content of particles having a diameter exceeding 40 μm is 8% by mass or smaller.

11. The seamless instrument panel according to claim 2, wherein the talc is present in an amount of 20 to 30% by mass and a distribution of a particle diameter is such that a content of particles having a diameter of 5 μm or smaller is 8% by mass or smaller and a content of particles having a diameter exceeding 40 μm is 8% by mass or smaller.

12. A seamless air bag cover obtained by injection molding comprising a resin composition which consists essentially of (A) 50 to 87% by mass of polypropylene, (B) 3 to 20% by mass of a thermoplastic elastomer and (C) 10 to 30% by mass of talc, wherein the talc has an average particle diameter of 15 to 25 μm and a distribution of a particle diameter such that a content of particles having a diameter of 5 μm or smaller is 10% by mass or a content of particles having a diameter exceeding 40 μm is 10% by mass or smaller.

13. A seamless instrument panel having an air bag cover which is obtained by integrally injection molding a seamless air bag cover comprising a resin composition which consists essentially of (A) 50 to 87% by mass of polypropylene, (B) 3 to 20% by mass of a thermoplastic elastomer and (C) 10 to 30% by mass of talc,
wherein the talc has an average particle diameter of 15 to 25 μm and a distribution of a particle diameter such that a content of particles having a diameter of 5 μm or smaller is 10% by mass or smaller and a content of particles having a diameter exceeding 40 μm is 10% by mass or smaller and an instrument panel comprising the resin composition.

14. A method for producing a seamless air bag cover or a seamless instrument panel having an air bag cover, comprising
injection molding a resin composition which comprises (A) 50 to 87% by mass of polypropylene, (B) 3 to 20% by mass of a thermoplastic elastomer and (C) 10 to 30% by mass of talc, wherein the talc has an average particle diameter of 15 to 25 μm and a distribution of a particle diameter such that a content of particles having a diameter of 5 μm or smaller is 10% by mass or smaller and a content of particles having a diameter exceeding 40 μm is 10% by mass or smaller,
wherein the thermoplastic elastomer is at least one selected from the group consisting of an ethylene-octene-1 copolymer and an ethylene-butene-1 copolymer.

15. A method for producing a seamless air bag cover or a seamless instrument panel having an air bag cover according to claim 14, wherein the resin composition comprises (C) 25 to 30% by mass of talc.

16. The method for producing a seamless air bag cover or a seamless instrument panel having an air bag cover according to claim 14, wherein the resin composition has (1) an Izod impact strength of 15 to 40 kJ/m$^2$ as measured in accordance with a method of ASTM D256 at 23° C. with a notch, (2) a flexural modulus of 1,600 to 3,000 MPa as measured in accordance with a method of ASTM D790 at 23° C. and (3) a melt flow rate (MFR) of 5 to 40 g/10 minutes as measured in accordance with a method of JIS K7210 at 230° C. under a load of 21.2 N (2.16 kgf).

17. The method for producing a seamless air bag cover or a seamless instrument panel having an air bag cover according to claim 14, wherein the talc is present in an amount of 20 to 30% by mass and a distribution of a particle diameter is such that a content of particles having a diameter of 5 μm or smaller is 8% by mass or smaller and a content of particles having a diameter exceeding 40 μm is 8% by mass or smaller.

18. The method for producing a seamless air bag cover or a seamless instrument panel having an air bag cover according to claim 14, wherein the thermoplastic elastomer is present in an amount of from 10 to 20% by mass.

19. The method for producing a seamless air bag cover or a seamless instrument panel having an air bag cover according to claim 14, wherein the thermoplastic elastomer is present in an amount of from 3 to 15% by mass.

20. The method for producing a seamless air bag cover or a seamless instrument panel having an air bag cover according to claim 14, wherein the polypropylene is a block polypropylene.

21. The seamless air bag cover according to claim 6, wherein the resin composition (1) an Izod impact strength of 15 to 40 kJ/m$^2$ as measured in accordance with a method of ASTM D256 at 23° C. with a notch, (2) a flexural modulus of 1,600 to 3,000 MPa as measured in accordance with a method of ASTM D790 at 23° C. and (3) a melt flow rate (MFR) of 5 to 40 g/10 minutes as measured in accordance with a method of JIS K7210 at 230° C. under a load of 21.2 N (2.16 kgf).

22. The seamless instrument panel according to claim 7, wherein the resin composition has (1) an Izod impact strength of 15 to 40 kJ/m$^2$ as measured in accordance with a method of ASTM D256 at 23° C. with a notch, (2) a flexural modulus of 1,600 to 3,000 MPa as measured in accordance with a method of ASTM D790 at 23° C. and (3) a melt flow rate (MFR) of 5 to 40 g/10 minutes as measured in accordance with a method of JIS K7210 at 230° C. under a load of 21.2 N (2.16 kgf).

23. The seamless air bag cover according to claim 6, wherein the talc is present in an amount of 20 to 30% by mass and a distribution of a particle diameter is such that a content of particles having a diameter of 5 μm or smaller is 8% by mass or smaller and a content of particles having a diameter exceeding 40 μm is 8% by mass or smaller.

24. The seamless instrument panel according to claim 7, wherein the talc is present in an amount of 20 to 30% by mass and a distribution of a particle diameter is such that a content of particles having a diameter of 5 μm or smaller is 8% by mass or smaller and a content of particles having a diameter exceeding 40 μm is 8% by mass or smaller.

25. The method for producing a seamless air bag cover or a seamless instrument panel having an air bag cover according to claim 15, wherein the resin composition has (1) an Izod impact strength of 15 to 40 kJ/m$^2$ as measured in accordance with a method of ASTM D256 at 23° C. with a notch, (2) a flexural modulus of 1,600 to 3,000 MPa as measured in accordance with a method of ASTM D790 at 23° C. and (3) a melt flow rate (MFR) of 5 to 40 g/10 minutes as measured in accordance with a method of JIS K7210 at 230° C. under a load of 21.2 N (2.16 kgf).

26. The method for producing a seamless air bag cover or a seamless instrument panel having an air bag cover according to claim 15, wherein the talc is present in an amount of 20 to 30% by mass and a distribution of a particle diameter is such that a content of particles having a diameter of 5 µm or smaller is 8% by mass or smaller and a content of particles having a diameter exceeding 40 µm is 8% by mass or smaller.

27. The method for producing a seamless air bag cover or a seamless instrument panel having an air bag cover according to claim 15, wherein the thermoplastic elastomer is present in an amount of from 10 to 20% by mass.

28. The method for producing a seamless air bag cover or a seamless instrument panel having an air bag cover according to claim 15, wherein the thermoplastic elastomer is present in an amount of from 3 to 15% by mass.

29. The method for producing a seamless air bag cover or a seamless instrument panel having an air bag cover according to claim 15, wherein the polypropylene is a block polypropylene.

30. The air bag cover of claim 1, wherein the resin composition comprises 20 to 30% by mass of talc.

31. The instrument panel of claim 2, wherein the resin composition comprises 20 to 30% by mass of talc.

32. The air bag cover of claim 12, wherein the resin composition comprises 20 to 30% by mass of talc.

33. The instrument panel of claim 13, wherein the resin composition comprises 20 to 30% by mass of talc.

34. The method of claim 14, wherein the resin composition comprises 20 to 30% by mass of talc.

35. The seamless airbag cover according to claim 1, wherein the thermoplastic elastomer is an ethylene-octene-1 copolymer.

* * * * *